June 1, 1965   W. D. HENDERSON   3,186,597
LIQUID METERING AND DISPENSING SYSTEM
Filed Sept. 27, 1963   3 Sheets-Sheet 1
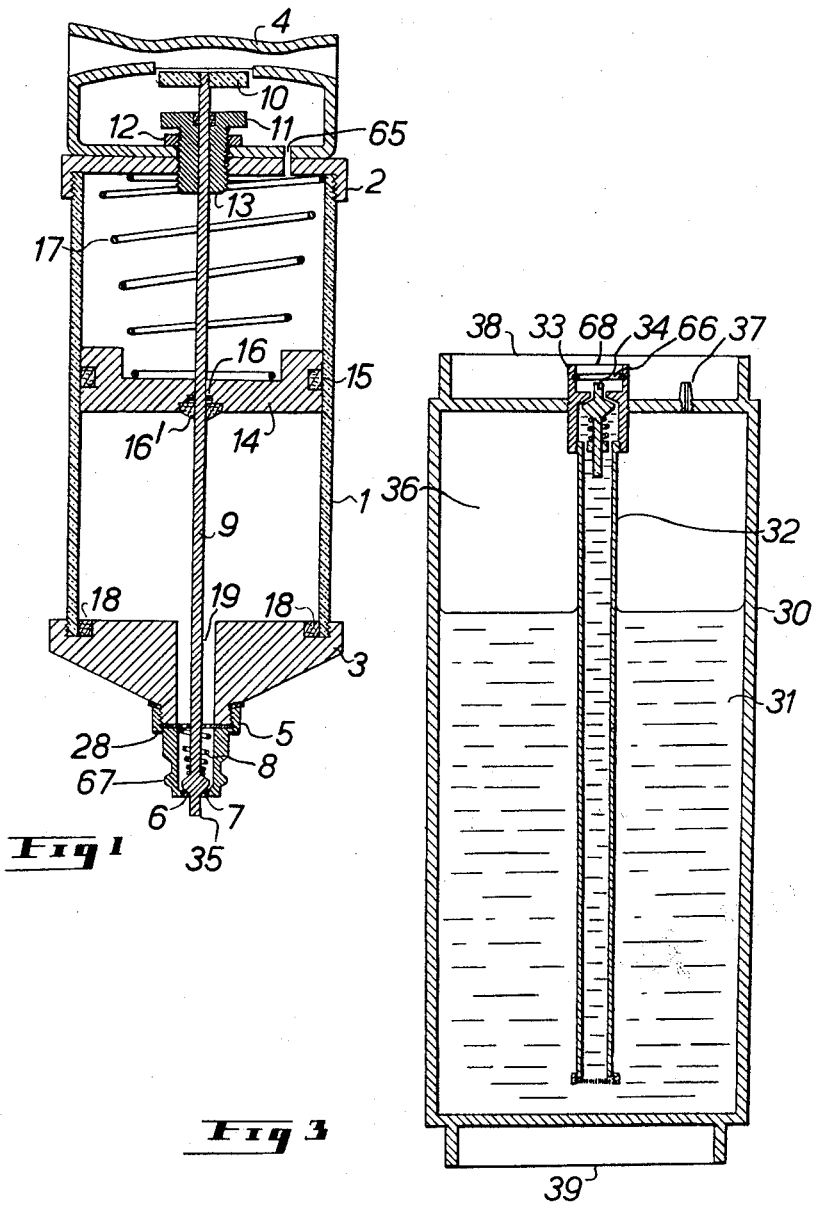

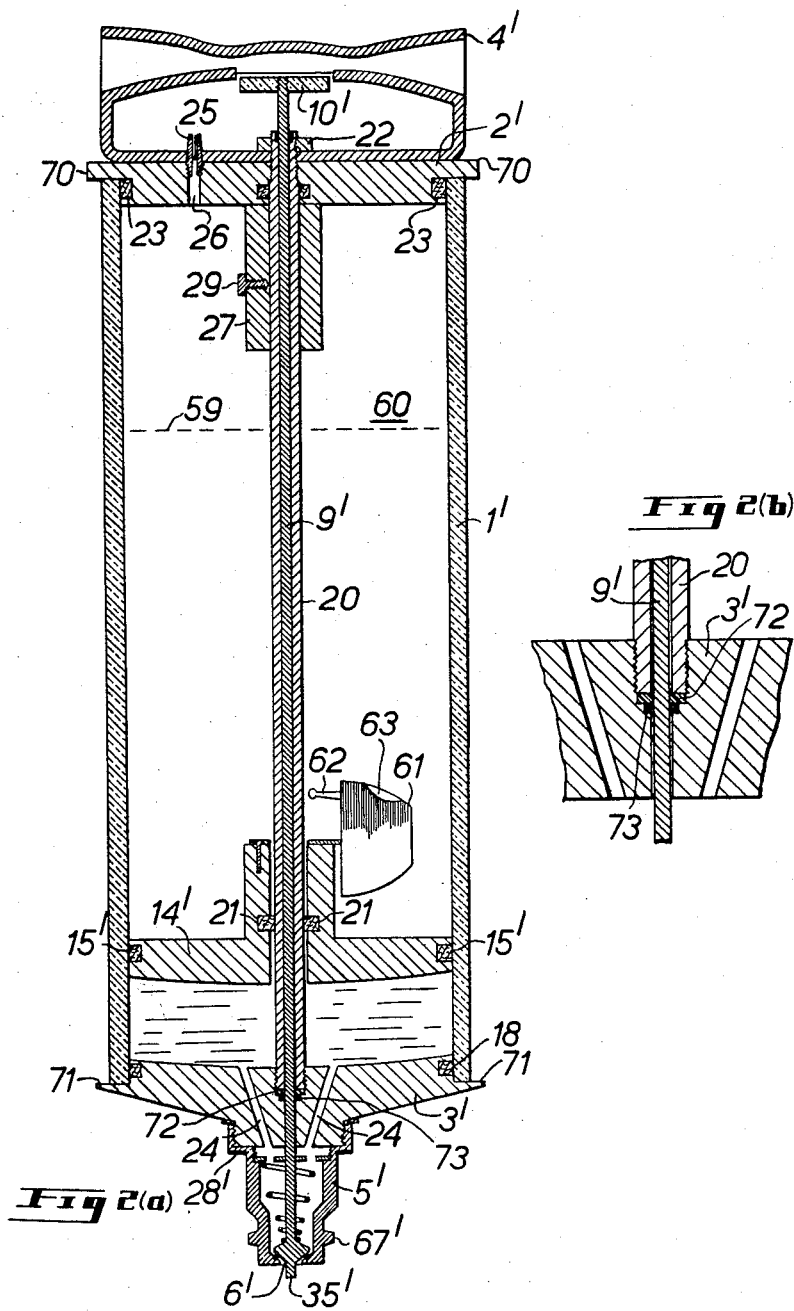

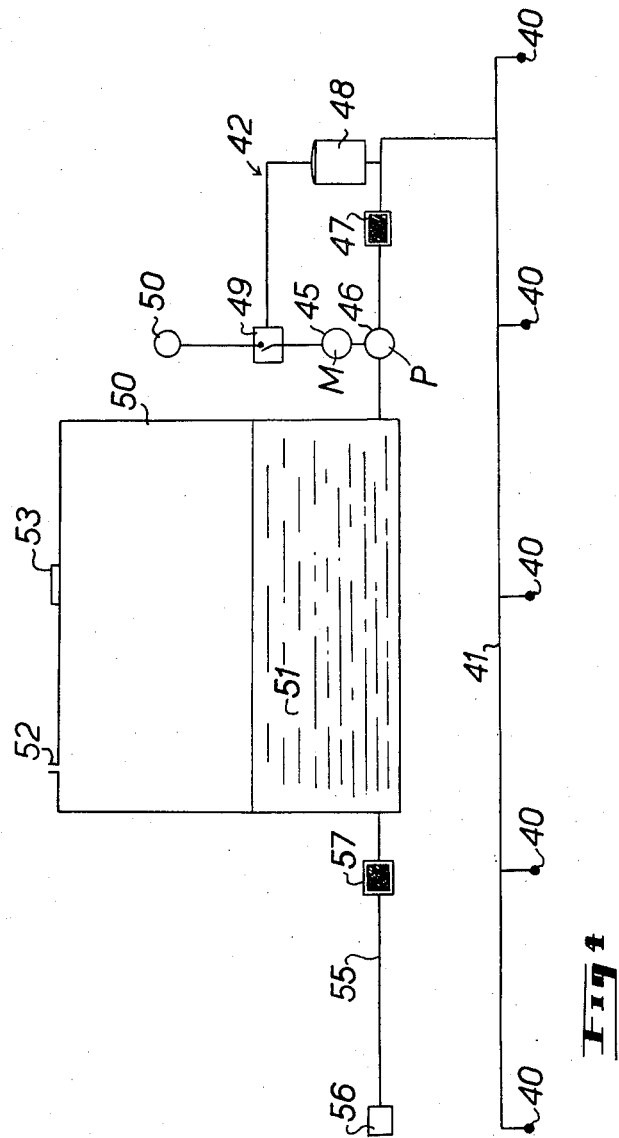

United States Patent Office 3,186,597
Patented June 1, 1965

3,186,597
LIQUID METERING AND DISPENSING SYSTEM
William Dick Henderson, 2328 Henderson Highway,
Winnipeg, Manitoba, Canada
Filed Sept. 27, 1963, Ser. No. 312,097
Claims priority, application Canada, Oct. 16, 1962,
860,182
9 Claims. (Cl. 222—30)

This invention relates to apparatus for measuring and dispensing liquids in a manner which provides both for accurate measurement of the quantity dispensed and for ease of dispensing.

The apparatus will find particular application in gasoline and oil stations for the delivery of "bulk" oil to automobiles. Although it is common practice to supply oil to motorists from bulk containers, such as large drums, it has in the past been necessary to measure the oil into an open topped jug or measuring can and then to carry this to the automobile. It is difficult for the motorist to see and be satisfied that the oil measuring can is filled to the proper mark and in dusty areas the inside of the measuring can will often become covered with a film which is carried into the engine when the oil is poured into it.

It is well known that the average automobile driver at a service station prefers his oil to be provided from a sealed can of a specific size, be it pint or quart measure, because in this way he knows that the oil will be clean, uncontaminated by dust and that he will get accurate measure without needing to worry further. Set against this, it is cheaper for the motorist to buy his oil from a bulk container since the costs of the cans and their filling and shipping are avoided.

It is an object of the present invention to overcome the difficulties encountered in the prior art by providing a system which is clean for the service station attendant to use in which dust contamination is minimized, and which is as convenient as the delivery of oil from sealed cans.

It should be borne in mind that the invention is not limited to the supply of oil and as other examples, metered quantities of such widely differing substances as beer, soft ice cream or ink, might be delivered.

A description of some embodiments of the invention will now be made with reference to the drawings, in which:

FIG. 1 shows a dispenser with a spring actuated discharge;

FIGS. 2a and 2b show a similar dispenser to that of FIG. 1, but with captive compressed air actuating the discharge (FIG. 2b being a detailed view of FIG. 2a);

FIG. 3 shows a bulk dispensing tank for filling either of the dispensers of FIGS. 1 and 2; and FIG. 4 shows a bulk dispensing system for supplying a plurality of outlet points for charging the dispensers of FIGS. 1 and 2.

As seen in FIG. 1, the dispenser comprises, a barrel 1, preferably of transparent material such as an acrylic plastic, to which are fitted end members 2 and 3. Member 2 carries a handle 4 and member 3, a male nozzle assembly 5. This nozzle may suitably be Aeroquipment 5602–8s manufactured by Industrial Equipment Ltd. Within nozzle 5 is a check valve 6 held against a seat 7 by means of a spring 8, this valve connects through a control rod 9 to a handle 10 above member 2. Rod 9 is passed through member 2 within a bushing 11. The bushing 11 is threaded into member 2, carries a locknut 12 and has a projecting nose 13. Received on rod 9 within cylinder 1 is a piston 14 carrying sealing ring 15 to prevent fluid leakage between the periphery of the piston and the cylinder wall. Piston 14 is sealed to rod 9 against fluid leakage by means of sliding seal 16. Seal 16 is held in position by a plug 16' which serves to block passage 19 to nozzle 5 when the piston 14 is in its lowermost position. This accurately determines the point at which no further liquid can be expressed from the dispenser. Above and received to nest in piston 14 and bearing against upper cover member 2 is a spring 17 which urges piston 14 towards the bottom end of cylinder 1. An air vent 65 is provided through member 2. By adjusting the position of nose 13 of bushing 11, the limit of upward travel of piston 14 may be fixed. End member 3 carries sealing ring 18 to prevent liquid leakage between it and cylinder 1.

The dispenser of FIGS. 2a and 2b, which is preferred, has many features in common with that of FIG. 1, and in the description of FIGS. 2a and 2b, the primed numbers refer to their counterparts in the apparatus of FIG. 1. In this embodiment, piston 14' is slidingly fluid sealed, by ring 21, to a guide support 20 which surrounds control rod 9'. The guide support 20 screws into bottom member 3 and passes through top member 2', a nut 22 is received above top member 2' for holding the assembly together. Support 20 is sealed into member 3' against liquid leakage from within cylinder 1' by gasket 72, which in turn positions sealing O-ring 73 for rod 9' against leakage from within nozzle 5'. An air pressure sealing ring 23 is provided on member 2' to prevent air leakage between it and tube 1'. Passages 24 are formed in member 3' to connect nozzle 5' with the interior of cylinder 1'. A stop 27 secured to support tube 20 by set screw 29 arrests piston 14' in the uppermost position. A valve 25 of the normal non-return type used in automobile tires is provided on member 2' and allows air under pressure to be introduced to the space 60 above piston 14' through passage 26. In the prototype, it was found satisfactory to pressurize space 60 to about 15 lbs./in.$^2$ gauge with piston 14' in its lowermost position. Preferably, the upper side of end member 3' is concave and the under side of piston 14' correspondingly convex so that there is always a tendency for a fluid remaining in the cylinder towards the end of the piston stroke to drain towards the axis of the cylinder and into the nozzle 5'. It is also preferable that the radius of curvature of the convex portion should be slightly greater than that of the concave portion so that the fluid can freely pass radially inwards of the cylinder when the piston approaches the bottom of its stroke, for complete exhaustion of the space beneath piston 14'. End members 2' and 3' are provided respectively with circumferential flanges 70 and 71 so that the dispenser can be placed on a rough flat surface without damage to the outer surface of the cylinder 1'.

FIG. 3 shows a drum 30 containing lubricant 31 or other liquid to be dispensed, and includes a dip tube 32 connected to a female coupling 33. This coupling receives a nozzle 5 or 5' and includes a spring loaded valve 34 which can be opened by depression by a nozzle pintle 35 or 35'. The coupling can suitably be the Aeroquipment 5601–8s. A seal 66 is also included in coupling 33 which engages against shoulder 67 or 67' on nozzle 5 or 5'. Additional sealing occurs between rim 68 and seal 28'. The space 36 above liquid 31 is pressurized through a valve 37 similar in construction to the valve 25. A protective flange 38 is provided on the container 30 and a base flange 39 similar to flange 38 supports it in upright position. Flanges 38 and 39 are dimensioned so that containers 30 will interlock with one another when stacked.

It can now be seen by introducing a large enough pressure in space 36 that the dispenser of FIGS. 1 or 2 may be charged by inserting the nozzle member 5 or 5' into the female coupling 33. The dispenser will automatically be charged until its piston 14 or 14' reaches stop 13 or 27. At this point, the lever 62 of counter 61 included in the apparatus of FIG. 2 is depressed by engagement with stop 27 and records the filling by advancing the number shown in window 63 by one. Lever 62 is so mounted that it does not prevent piston 14′ from contacting stop 27.

When the dispenser is charged, it is removed from the female coupling 33, and is carried to the automobile or place of disposal and the liquid contained can then be rapidly discharged under the action of spring 17 or air pressure in space 60 through the nozzle 5 or 5′ by raising handle 10 or 10′. There is the advantage that using a transparent material for cylinder 1 or 1′ the customer can see the measure of liquid he is obtaining. In the embodiment of FIG. 1, the piston is depressed by means of the spring 17 and in that of FIG. 2, the piston is forced down by the compressed air in the space above it. However, since it is arranged that liquid delivered from the coupling 33 is under greater pressure than that to which it can be raised by the spring or air in the space above the piston, the dispenser can always be properly filled until prevented by the engagement of the piston with its stop member 13 or 27. In the embodiments of FIGS. 1 and 2, as described and shown, it has been found that pressurizing the space 36 to about 150 lbs./in.² gauge initially gives adequate rate of flow of liquid into the dispensers. If this rate of flow falls too low during use, more air can be added through valve 37 to increase it. Clearly for the apparatus of FIG. 2, the pressure must be above that to which air in space 60 is raised when piston 14′ is at its uppermost position.

In instances where it is desirable to supply a number of gasoline islands, or the like, where oil or liquid should be made available, the set up of FIG. 4 may be employed. Here female couplings similar to those shown in FIG. 3 are arranged at the points 40 being supplied through a pipe or conduit 41 from a central pressure system 42. This system 42 comprises a motor 45 driving a pump 46 which feeds pipe 41 through a filter 47 and includes a hydraulic accumulator 48. The accumulator is connected to a switch 49 to maintain a given pressure in line 41. This pressure must be greater than that to which liquid can be raised by the spring 17 or air in space 60. A power supply 50 feeds the switch 49. Liquid to be delivered by pump 46 is drawn from a large reservoir or container 50 containing liquid 51 which additionally may be pressurized through an air valve 52 if desired. New liquid can be introduced into container 50 through a filler cap 53. In some cases, it may be desirable to charge liquid into container 50 through a line 55 from another source of supply 56. A filter 57 is conveniently provided in the line 55.

The volume of liquid received by the dispensers can be adjusted to be strictly accurate in FIG. 1 by altering the position of bushing 11 by rotating it and in FIG. 2 by placing shims between stop 27 and end member 2′, if the quantity is to be reduced, or by removing metal from the end of stop 27 to reduce its length if the quantity is to be raised.

Although this description has been restricted to liquids, this term is intended to include substances such as very finely divided solids or liquids containing finely divided solids which behave as liquids in operation of the apparatus described.

What I claim is:

1. A liquid metering and dispensing system which comprises, a cylinder, a piston received for movement in said cylinder, a nozzle on said cylinder at one side of said piston, permanent resilient means for exerting force on the other side of said piston, said nozzle comprising, a valve having a closed and an open postion for respectively restraining and permitting passage of liquid through said nozzle and into and out of the space defined by said cylinder and said one side of said piston, said piston being moveable under said resilient means into a position for exhausting said space and said valve being normally urged towards its closed position; a second nozzle for co-operation with said first nozzle, means for supplying liquid under pressure to said second nozzle, said first and second nozzle operatively co-operating upon mutual connection for allowing liquid passage from said second nozzle into said space defined by the cylinder and one side of the piston and movement of said piston in a direction against said resilient means, a stop for limiting movement of said piston and accurately determining the maximum volume of liquid in said space, said liquid supplied to said second nozzle being pressurized for moving said piston towards said stop for defining a chosen volume of liquid in said cylinder, and operating means for moving said valve into its open position and for discharging said chosen volume of liquid from said cylinder under force from said resilient means and exhausting said cylinder.

2. A metering and dispensing system as defined in claim 1, wherein said cylinder is closed on the other side of said piston and means for admitting gas under pressure into said cylinder on said other side of said piston to provide said resilient means.

3. A metering and dispensing system as defined in claim 1, said second nozzle including a valve normally urged towards its closed position and a pintle extending therefrom, said valve in said first nozzle also including a pintle extending therefrom for engagement with said second nozzle pintle upon mutual connection of said nozzles, mutual pressure of said pintles upon one another serving to open their respective valves.

4. A metering and dispensing system as defined in claim 1, said stop being adjustable for altering the length of travel of said piston before engaging said stop.

5. A metering and dispensing system as defined in claim 1, wherein means for supplying said pressurized liquid comprises, a chamber defining a liquid containing compartment and a space above said liquid, means for admitting gas under pressure to said chamber and into said space, said second nozzle being connected to said liquid in said chamber.

6. A metering and dispensing system as defined in claim 1, said means for supplying said pressurized liquid compriing a pump and energizing means for said pump, said second nozzle being connected to receive liquid from said pump.

7. A metering and dispensing system as defined in claim 1, said means for supplying said pressurized liquid comprising a liquid reservoir, pump means connected with said reservoir, conduit means connecting said pump with said second nozzle, and a hydraulic accumulator connected to said conduit.

8. A metering and dispensing system as defined in claim 1, comprising counter means adjacent said cylinder, said counter means being actuated upon movement of said piston relatively to said cylinder for recording the number of reciprocations of said piston.

9. A metering and dispensing system as defined in claim 8, said counter means comprising an actuating arm extending therefrom, relative movement of said piston and said cylinder moving said arm for recording by said counter.

References Cited by the Examiner
UNITED STATES PATENTS

| | | | |
|---|---|---|---|
| 1,545,379 | 7/25 | Winkley | 222—389 |
| 1,763,062 | 6/30 | Murphy | 141—349 |
| 2,266,680 | 12/41 | Ritchie | 222—510 |
| 2,305,158 | 12/42 | Hanses | 222—340 X |
| 2,361,126 | 10/44 | Klein | 222—340 |
| 2,818,999 | 1/58 | Miller | 222—389 X |
| 3,129,730 | 4/64 | Simon | 222—464 X |

LOUIS J. DEMBO, *Primary Examiner.*